INVENTORS
D. B. FRASER
H. M. O'BRYAN, JR.
J. THOMSON, JR.
BY George S. Indig
ATTORNEY 3,718,723
Patented Feb. 27, 1973

3,718,723
USE OF WATER SOLUBLE LANTHANUM COMPOUNDS IN LEAD ZIRCONATE-LEAD TITANATE CERAMICS

David Bruce Fraser, Berkeley Heights, Henry Miles O'Bryan, Jr., Plainfield, and John Thomson, Jr., Spring Lake, N.J., assignors to Bell Telephone Laboratories, Incorporated, Murray Hill, N.J.
Filed Oct. 23, 1970, Ser. No. 83,417
Int. Cl. C04b 33/12, 35/46, 35/48
U.S. Cl. 264—61       3 Claims

ABSTRACT OF THE DISCLOSURE

Highly transparent and optically uniform ferroelectric ceramics in the lanthanum substituted lead zirconate-lead titanate system are produced using a water soluble lanthanum compound as one of the starting materials and processing the materials in accordance with narrowly defined procedures. A preferred class of ceramics is produced starting with materials whose anions are in the proportion; Pb:$(1-x+z)$, La:$x$, Zr:$y$ and Ti:$(1-y)$ where $$0.02 \leq x \leq 0.12, \left(\frac{x}{4}\right) \leq Z \leq 0.8 \text{ and } 0.6 \leq y \leq 0.7$$

The use of 2 to 6 percent of a water soluble lanthanum compound results in unexpectedly high remanent birefringence in the hot pressed ferroelectric ceramic body as compared with bodies in which the same amount of lanthanum was added as a finely divided oxide.

BACKGROUND OF THE INVENTION

(1) Field of the invention

Transparent ferroelectric ceramics are produced for use in optical memory and optical modulator devices.

(2) Description of the prior art

The advent of the laser has focused new interest in optical devices. Such devices are at present under active development for various communication, memory and display uses. A critical element in any of these systems is the electrooptic device which varies the optical properties of the light path in accordance with electrical information. In the past the development of these electrooptic devices has concentrated upon the use of single crystal ferroelectric materials, since only these single crystal materials possessed sufficient optical perfection (transparency and uniformity of index of refraction) for these critical devices. The difficulty in obtaining these crystalline materials in sufficiently large size and sufficient uniformity has been a limitation in these developments. Recently, however, a breakthrough has been made in this area. It has been found that the minor substitution of lanthanum for lead in the lead zirconate-lead titanate ceramic system results in a sufficient increase in the transparency of these otherwise opaque ceramics to make them seem attractive for these uses (Ceramic Bulletin, vol. 49, No. 4 (1970), page 411). Since they are ceramic materials, they can be inexpensively fabricated into almost any desired shape. In addition, these materials possess larger electrooptic coefficients than all but the best single crystal materials. In order to improve the performance of electrooptic devices made from these materials, it would be highly desirable to develop transparent ferroelectric ceramics of even greater transparency and uniformity. In addition, better electrooptic properties would generally be desirable.

SUMMARY OF THE INVENTION

Ferroelectric ceramics in the lanthanum substituted lead zirconate-lead titanate system possessing greater transparency and improved uniformity of index of refraction have been produced with lower lanthanum substitution. Many of these materials also possess higher remanent birefringence. The improved processing techniques which have made this possible include the use of a soluble lanthanum salt in aqueous solution to provide the lanthanum substitution in place of the lanthanum oxide powder formerly used. The use of lanthanum in solution significantly reduces the lanthanum requirement (by as much as a factor of 2). Since increased lanthanum substitution reduces the Curie temperature of these materials, the lower lanthanum requirement leads to the realization of improved performance in higher Curie temperature materials. This is a great advantage in many device uses in which intense light sources tend to heat the ceramic material. Other aspects of the improved processing techniques disclosed here include the use of higher prereaction temperatures than previously used for these materials and the control of lead content during processing. The resulting materials generally show a 5 to 10 percent reduction in optical attenuation over the visible and many show a 50 percent increase in remanent birefringence.

For many of the devices being considered, ceramics made from starting materials containing the following anion atomic proportions have been shown to possess the best device properties and are recommended:

Bb:$(1-x+z)$, La:$x$, Zr:$y$ and Ti:$(1-y)$ where $$0.02 \leq x \leq 0.12, \left(\frac{x}{4}\right) \leq z \leq 0.8$$

and $$0.6 \leq y \leq 0.7$$

Lanthanum substitutions between 2 percent and 6 percent ($0.02 \leq x \leq 0.06$) result in materials with a high remanent birefringence. (Percentages will always refer to "atom percent.") These materials are most advantageously used in memory type devices. Lanthanum substitutions from 8.5 percent to 12 percent result in low remanent birefringence materials. These materials are most advantageously used in modulator type devices.

DETAILED DESCRIPTION OF THE INVENTION

Device uses

Figure 1:
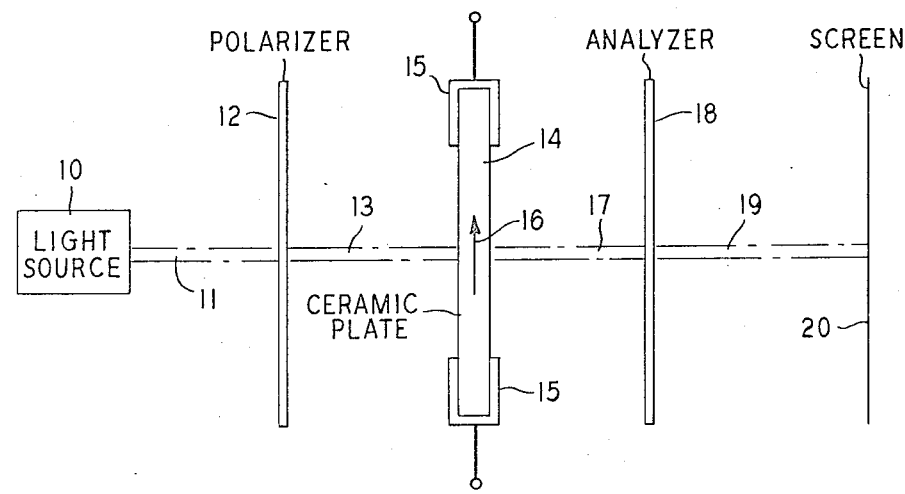
FIG. 1 is a schematic view of an exemplary optical ssytem employing a ceramic plate of the disclosed composition.

FIG. 1 shows, in schematic form, a simple exemplary optical system employing the disclosed ferroelectric ceramics. The light source 10, which may be a laser or any other type of light emitter, emits a light beam 11 which is incident on polarizer 12. The emerging light beam 13 which is now polarized in a plane at 45 degrees to the plane of the paper is incident upon the ferroelectric ceramic plate 14. If a potential is applied between the affixed electrodes 15, the resulting electric field 16 in the ceramic plate induces a birefringence such that the component of light polarized parallel to the direction of the field 16 travels at a different velocity through the ceramic plate 14 than the component of light polarized perpendicular to the field 16. When the phase difference between these components reaches 180 degrees, the polarization of the emerging beam 17 will be perpendicular to the polarization of the beam 13. An analyzer 18 is then used to differentiate between the states of polarization with and without the 90-degree rotation (i.e., with and without the potential applied).

If the ceramic plate 14 is composed of a low remanent birefringence material, the birefringence of the plate varies with the magnitude of the electric field 16 and the intensity of the beam 19 emerging from the analyzer will vary with applied electric fields 16. This variation can be observed on the screen 20 or in any suitable optical detector. If the ceramic plate 14 is composed of a high remanent birefringence material, the application of the electric field 16 will produce a remanent birefringence in the ceramic 14 and beam 19 will possess the resulting intensity even after the removal of the electric field 16. A lower birefringence state can subsequently be obtained by applying a partial field in the reverse direction. The above device is only one of the many possible optical systems which make use of these two general types of ceramic materials. One other class of devices which deserves mention at this point depends upon the fact that for any degree of birefringence, the phase difference between the parallel and perpendicularly polarized light components varies with the frequency of the light. Using this property, optical systems can be constructed which differentiate between light of different colors in accordance with the applied field 16. Usage of this principle to form colored display devices has been suggested.

Compositions

The inventive process, including the use of a water soluble salt of lanthanum, which will decompose to lanthanum oxide at a temperature below the temperature of the prereaction step, results in the improvement of the optical properties (and in many cases electrooptic properties) of a wide range of ceramic compositions within the lanthanum substituted lead zirconate-lead titanate system. The resulting ceramics are much more optically uniform and show generally a 5 to 10 percent decrease in optical attenuation as opposed to similar materials using lanthanum oxide powders. In addition, many show a 50 percent increase in remanent birefringence.

Ceramic compositions around the 65 percent zirconium/35 percent titanium range are suggested, here, as providing favored electrooptic properties for use in memory type applications (those requiring high remanent birefringence materials). This composition range is also suggested as being useful for modulator type devices (those requiring low remanent birefringence materials). The recommended compositions are produced from starting materials represented by the anion atomic proportions Pb:$(1-x+z)$, La:$x$, Zr:$y$ and Ti:$(1-y)$ where $$0.02 \leq x \leq 0.12, \left(\frac{x}{4}\right) \leq z \leq 0.08 \text{ and } 0.6 \leq y \leq 0.7$$

In these compositions the inclusion of from 2 percent to 6 percent lanthanum ($0.02 \leq x \leq 0.06$) results in high remanent birefringence materials while the inclusion of 8.5 percent to 12 percent lanthanum ($0.085 \leq x \leq 0.12$) leads to the formation of low remanent birefringence materials.

Material properties

Figure 2:
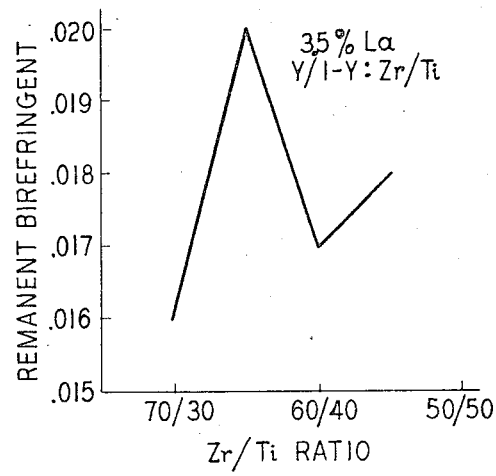
FIG. 2 is a curve showing remanent birefringence as a function of zirconium/titanium ratio for 3.5 percent lanthanum substituted ceramics.
Figure 3:
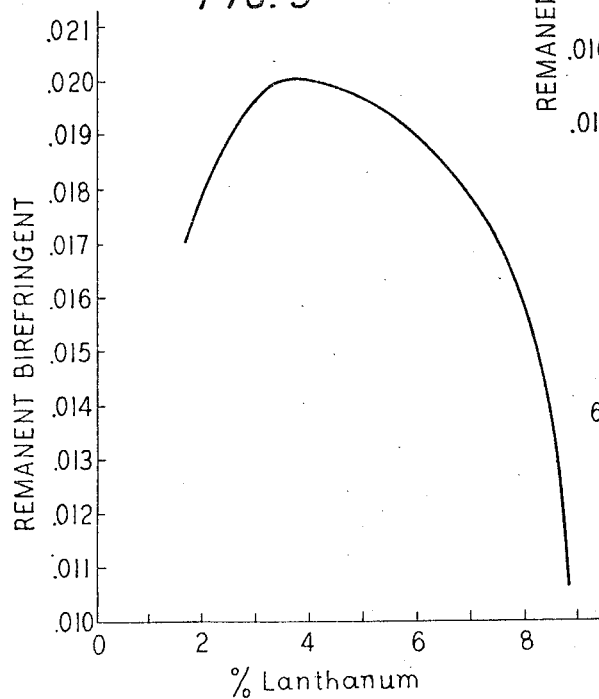
FIG. 3 is a curve showing remanent birefringence as a function of percent lanthanum substitution for 65 percent zirconium/35 percent titanium ceramics.

An aqueous solution of a lanthanum salt, which will decompose to lanthanum oxide at a temperature less than the temperature of the prereaction step, is advantageously employed according to the method to be described below throughout the lanthanum substituted lead zirconate-lead titanate system in place of previously used lanthanum oxide. Over large portions of the composition range, improved transparency is observed for lower lanthanum content. FIG. 2 shows that, for the high remanent birefringence type materials exemplified by a 3.5 percent lanthanum content, the remanent birefringence is maximum in the neighborhood of the 65 percent zirconium/35 percent titanium composition. FIG. 3 shows that at this 65/35 ratio the remanent birefringence is a maximum in the neighborhood of 3.5 percent lanthanum substitution. These materials show 5 to 10 percent higher transparency, and uniformity of index of refraction than materials made with similar processing but using lanthanum oxide powder as a starting material.

Processing

The starting materials, aside from the lanthanum compound, are usually employed in powdered oxide form. However, other powders which decompose to oxides (e.g., carbonates, nitrates and sulphates) may be used. Starting materials in proportion to the desired composition are placed in a blending apparatus. If second phase inclusions are observed in the resulting ceramic the fault probably lies in the loss of some of the relatively volatile lead oxide during subsequent processing steps. To remedy this, additional lead oxide is incorporated in the starting materials.

According to the invention the lanthanum is added as an aqueous solution of a lanthanum compound which will decompose to lanthanum oxide during the prereaction step. Lanthanum nitrate and lanthanum acetate are useful in this regard. This solution is added to the powdered starting materials in a suitable blending device. Alternatively, the water soluble compound can be introduced as a salt, as specified in the "Compositions" section and sufficient water to form the solution specified in the "Summary of the Invention" can be added separately.

A common blending device, which may be used here, is a ball mill. In addition to the water introduced as described in the preceding paragraph, it is advisable to introduce sufficient water or any other liquid compatible with water (e.g., alcohol or acetone) as would conform to best milling practice. In order to prevent accidental impurities produced by the balls themselves, lead zirconate-titanate ceramic balls can be used in the mill instead of the alumina or metallic balls usually employed in ball milling operations.

After the starting materials are thoroughly blended, they are dried in a suitable drying apparatus which is equipped with a stirring mechanism required to maintain the dispersion of the lanthanum salt during drying. The dried powders are then prereacted by placing them in a suitable container, such as a platinum crucible, and maintaining them at a temperature between 800 degrees centigrade and 1100 degrees centigrade for between 1 and 8 hours. At less than 1 hour the chemical reactions have not progressed to the desired degree of completion while times of more than 8 hours are uneconomic.

The selection of a temperature and time schedule must be consistent with the attaining of the desired chemical reactions yet preventing the inordinate loss of the relatively volatile lead oxide. Temperatures as low as 800 degrees centigrade can be used while still observing the benefits of adding lanthanum as a solution. The use of prereacting temperatures below 800 degrees centigrade result in a significant loss of optical uniformity. In order to achieve a marked increase in uniformity it is preferable to prereact at temperatures of 925 degrees centigrade or above. At temperatures greater than 1100 degrees centigrade, the loss of lead oxide can become serious. Also, grain growth with consequent difficulty in the subsequent hot pressing step is observed. In order to minimize the loss of lead oxide, the use of a covered crucible is recommended, although not necessary.

After prereaction the powders are once again blended in an apparatus such as the ball mill previously used. In order to accomplish the desired degree of blending, the addition of a fluid, such as water or an organic solvent, is recommended. In the subsequent drying operation, stirring is no longer required since the lanthanum is not now in soluble form. The powders are then densified to form the final ceramic by hot pressing. This is accomplished in a die under pressure greater than 1500 pounds per square inch which are applied for times greater than 8 hours at temperatures greater than 1050 degrees centigrade. For lower pressures, temperatures and times densification do not progress to a sufficient degree and an undesirably large number of voids remain. There is no upper limit to the pressure which may be used. Times greater than 72 hours are not economically feasible. Hot pressing temperatures greater than 1200 degrees centigrade result in larger grain size which may be detrimental to the operation of some devices. Also such temperatures may lead to an undesirably large loss of lead content. The worker skilled in the art will, of course, realize the interrelationship between time, temperature, and pressure such that, for instances, at higher temperatures and longer times, lower pressures, within the limits specified, will be adequate to produce the desired densification and elimination of voids within the ceramic body. In order to prevent the reduction of the oxides in the ceramic, hot pressing is done under oxidizing conditions, such as the use of an air or oxygen ambient and the use of oxide (e.g., alumina) dies.

Example

In one experiment which resulted in the formation of a memory type material, of excellent optical and electro-optic properties, starting materials were used in such quantity as to make 200 grams of prereacted powder whose proportional anion composition was according to the proportions; Pb:0.99; La:0.35; Zr:0.65 and Ti:0.35. A lanthanum nitrate solution containing 0.1 gram of lanthanum per milliliter of water was used together with sufficient water for ball milling. Lead zirconate-titanate balls were used in the mill. The resulting blended slurry was slowly dried while stirring over a period of approximately 2 hours. The dried powders were prereacted at 950 degrees centigrade in a covered platinum crucible for 6 hours. The prereacted powders were ball milled together with carbon tetrachloride for 2 hours after which the slurry was dried to once again form a powder. The prereacted powder was cold pressed to make ap reformed slug one-eighth inch smaller in diameter than the alumina die. The slug was placed in the die together with a quantity of 100 mesh stabilized zirconium oxide powder in such a way as to surround the slug by a one-sixteenth inch envelope of the zirconium oxide powder. The slug was then hot pressed for 12 hours at 1150 degrees centigrade and 3,000 pounds per square inch pressure in an oxidizing atmosphere.

What is claimed is:

1. A process for the production of a transparent ferroelectric ceramic body in the lanthanum substituted lead zirconate-lead titanate system comprising:
   (a) blending a slurry of starting materials which comprise a lanthanum compound and oxides or carbonates of lead, zirconium and titanium,
   (b) producing a mixed powder from the slurry by a powdering step comprising drying the slurry,
   (c) prereacting the mixed powder by maintaining the mixed powder at an elevated prereaction temperature for a prereaction time thus forming a prereacted powder,
   (b) blending the prereacted powder,
   (e) hot pressing the prereacted powder by maintaining the prereacted powder at an elevated pressing temperature for a pressing time while subjecting the prereacted powder to a pressing pressure thereby forming the ceramic body wherein the improvement comprises:
   (1) adding the lanthanum as a water soluble lanthanum compound which will decompose to lanthanum oxide at a temperature of less than the prereaction temperature and sufficient water to dissolve the compound
   (2) stirring the slurry during drying in order to reduce segregation of the soluble lanthanum compound,
   (3) including as starting materials anions in such proporation as is represented by Pb:(1−x+z), La:x, Zr:y and Ti:(1−y), where
$$0.02 \leq x \leq 0.06, \frac{x}{4} \leq z \leq 0.08$$

and
$$0.60 \leq y \leq 0.70$$

(4) prereacting between 800 degrees centigrade and 1100 degrees centigrade for a time between 1 hour and 8 hours; and
   (5) pressing at a temperature between 1050 degrees centigrade and 1200 degrees centigrade, for a pressing time greater than 8 hours at a pressing pressure greater than 1500 pounds per square inch.

2. A process of claim 1 in which the lanthanum compound is at least one member selected from the group consisting of lanthanum nitrate and lanthanum acetate.

3. A process of claim 1 in which the water soluble lanthanum compound and the sufficient water to dissolve the compound are added together as a solution.

References Cited

UNITED STATES PATENTS

| | | | |
|---|---|---|---|
| 3,026,210 | 3/1962 | Coble | 264—332 |
| 2,823,134 | 2/1958 | Atlas | 106—39 |
| 3,577,487 | 5/1971 | Sanchez et al. | 264—56 |
| 3,666,666 | 5/1972 | Haertling | 106—39 |

OTHER REFERENCES

G. H. Haertling et al.: "Hot-Pressed Ferroelectric Ceramics for Electro-Optic Applications," Ceramic Bulletin, April 1970, at 411–412.

G. H. Haertling: "Hot-Pressed Lead Zirconate-Lead Titanate Ceramics Containing Bismuth," Ceramic Bulletin, December 1964, at 875–879.

G. H. Haertling et al.: "Hot-Pressed (Pb, La)(Zr, Ti)$O_3$ Ferroelectric Ceramics for Electrooptic Applications," January 1971, Jour. of Amer. Ceramic Soc. at 1–11.

LORENZO B. HAYES, Primary Examiner

J. H. MILLER, Assistant Examiner

U.S. Cl. X.R.

106—39 R; 252—62.9; 264—65, 66, 125, 332